Oct. 15, 1946.                D. F. McGILL                    2,409,374
                        FLUID-TRANSMISSION MECHANISM
                        Filed April 25, 1941          4 Sheets-Sheet 3

D. F. McGILL
INVENTOR.

BY  Harold D. Cook
ATTORNEY.

Oct. 15, 1946.   D. F. McGILL   2,409,374
FLUID TRANSMISSION MECHANISM
Filed April 25, 1941   4 Sheets-Sheet 4

D. F. McGILL
INVENTOR.

BY *Harold P. Cook*
ATTORNEY.

Patented Oct. 15, 1946

2,409,374

UNITED STATES PATENT OFFICE 2,409,374

FLUID TRANSMISSION MECHANISM

Daniel F. McGill, Portland, Oreg., assignor to
Donald W. Green, Portland, Oreg., as trustee Application April 25, 1941, Serial No. 390,294

12 Claims. (Cl. 60—53)

1

This invention relates to a hydraulic or fluid transmission mechanism wherein a fluid medium is employed to transmit torque from a driving shaft to a driven shaft.

The primary object of the invention is to provide a fluid connection between a driving shaft and a driven shaft, which connection will perform all of the functions customarily accomplished by the conventional clutch and reduction gearing of transmission devices. The transmission is intended for use wherever it is customary to employ either a fixed or variable ratio gear train in the transmission of power.

A further object of the invention is the provision of an improved transmission mechanism of the character described, capable of producing an infinite number of changed speed and torque ratios automatically, solely in response to load conditions, without the intervention of an operator.

A further object of the invention is to provide a fluid transmission mechanism wherein a kinetic or turbine drive is combined with a pressure drive to provide a more extended range of gear ratios.

These and other desired objects and advantages of the invention are obtained through the novel arrangement, the unique construction, and the improved combination of the various parts hereinafter described in conjunction with the accompanying drawings, it being understood that various changes in form, proportion, size and details of construction within the scope of the claims may be resorted to without departing from the spirit or sacrificing any of the advantages of the invention.

In the drawings:

Figure 1 is a sectional elevation, taken longitudinally of a transmission mechanism embodying the principles of the present invention.

Figure 2 is a development of the interior of the transmission on a surface generated by the rotation of the line 2—2 of Figure 1 about the longitudinal axis of the casing. The valves are illustrated as being in position to permit the driven shaft to be driven in the same direction of rotation as the drive shaft, under which conditions the flow of liquid through the device is as indicated by the arrows. The several vertical sections of the transmission unit shown in Figures 3 to 7, inclusive, correspond to the section lines indicated in Figures 1 and 2.

2 trating the construction of the pump rotor, and particularly illustrating the novel shape of the rotor chamber. The port shown is one of the discharge ports from the pump chamber.

Figure 1:
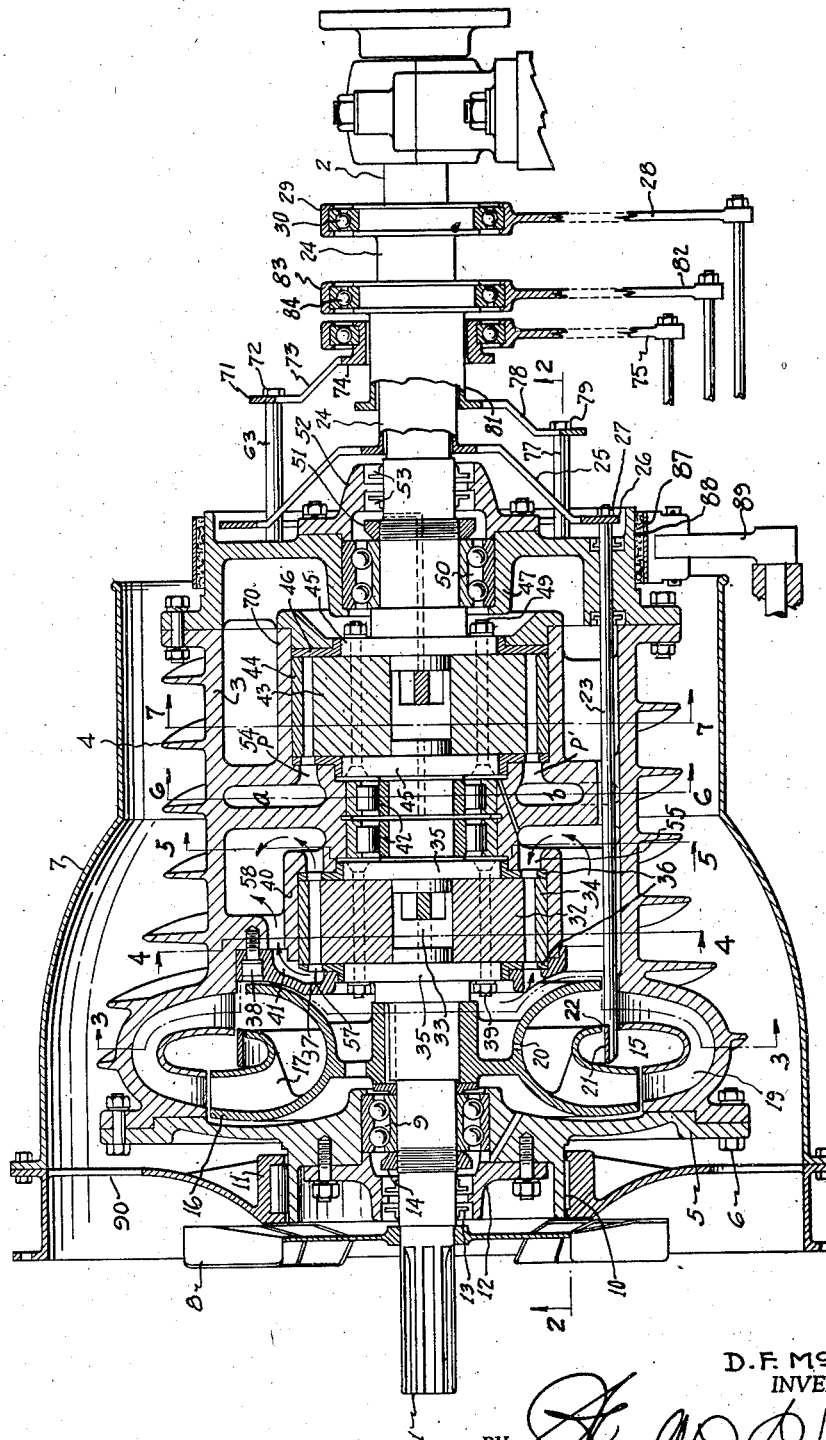
Figure 5:
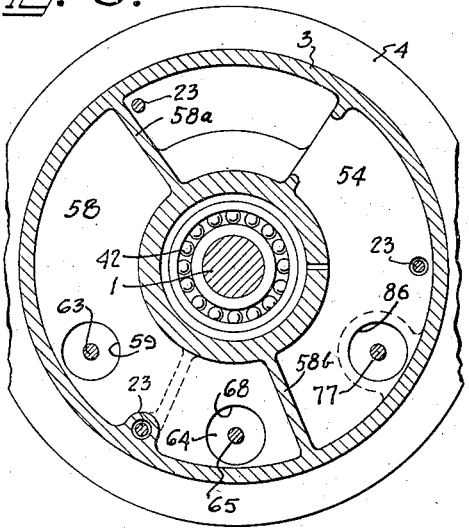

Figure 5 is a vertical section of the transmission unit, taken on the line 5—5 of Figure 1, showing the construction of the bearing for supporting the radial load at the inner end of the drive shaft.

Figure 6:
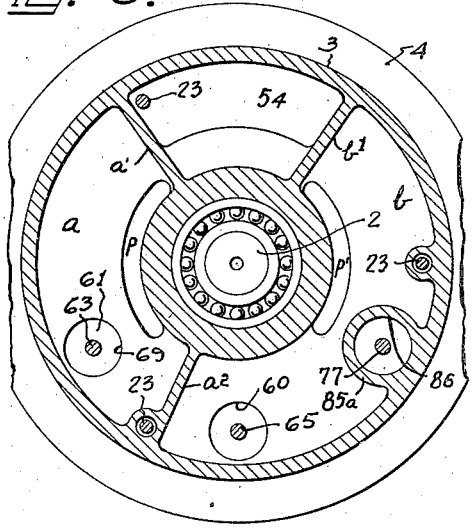

Figure 6 is a vertical section of the transmission unit, taken on the line 6—6 of Figure 1, showing the construction of the bearing for supporting the radial load at the inner end of the driven shaft, and showing the ports for the motor.

Figure 7:
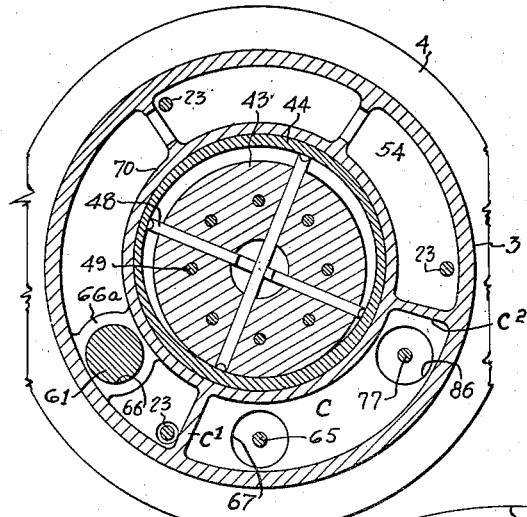

Figure 7 is a vertical section of the transmission unit, taken on the line 7—7 of Figure 1, illustrating the construction of the motor rotor.

Figure 8:
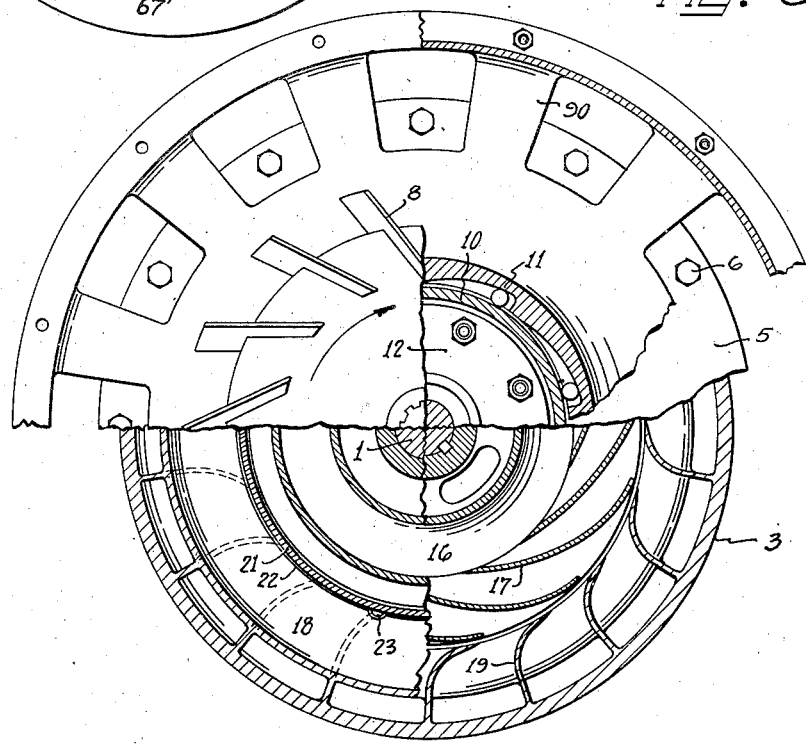

Figure 8 is an end elevation of the transmission unit, taken from the left of Figure 1, wherein there is shown in full lines a portion of the hood or cover for the transmission unit, together with a portion of the fan for positively circulating air between the cover and the casing, and showing in section the construction of the free wheeling or overriding clutch, and illustrating the center line shapes of the vanes of the impeller and the turbine runner.

A transmission unit embodying the principles of the present invention is illustrated in the accompanying drawings, wherein is shown a drive shaft 1 and a driven shaft 2 mounted in axial alignment. Rotatably journaled upon the driving and driven shafts is a casing 3 enclosing the ends of the respective shafts and having mounted therewithin elements of a delivery pump and motor for developing torque by means of fluid pressures, together with elements of an impeller and turbine for transmitting torque by means of fluid velocities and pressures. A control valve is provided for determining the driving ratio between the driving and driven shafts, together with valves for determining the direction of rotation of the driven shaft. A brake is provided for holding the casing stationary whenever the driven shaft is to be driven in a direction opposite to the direction of rotation of the drive shaft, at which time a ring valve is moved in position to stop the flow of fluid from the impeller to the turbine.

More specifically, the casing 3 comprises a cylindrical shell having fins 4 cast integrally therewith to more effectively radiate heat generated within the casing. At the forward or engine end of the transmission, the casing 3 is closed by an end plate 5, the meeting flanges of the cylindrical shell and of the end plate being secured by bolts 6. Surrounding the casing 3 so as to form a hood or cover therefor is a cylindrical shell 7 designed to be securely bolted or otherwise fastened to a frame or other stationary part. The fins 4 preferably form a spiral on the exterior of the casing 3, and upon rotation of the casing the fins 4 serve to move a current of air through the space between the shell 7 and the casing 3 to dissipate the heat radiated therefrom. Rotation of the casing 3 is governed entirely by the torque requirements of the driven shaft and so does not always rotate with sufficient rapidity to cause the fins 4 to move a current of air through the shell 7. For this reason a fan 8 is keyed to the drive shaft 1 and is designed to create a flow of air through the shell 7 whenever the drive shaft is rotated, thus providing for a positive cooling of the exterior surface of the casing independently of the speed of rotation thereof.

The end plate 5 is recessed around the shaft 1 to receive bearings 9 which serve both to support the radial load of the end of the casing and to receive the end thrust. The end plate 5 is provided with a cylindrical flange 10 forming a part of an overriding clutch or free wheeling unit 11 hereinafter more specifically described. Centrally of the flange 10 is a plate 12 in which is mounted oil seal rings 13. A nut 14 is threaded on the shaft 1 to provide for adjustment of the bearings 9.

Keyed to the shaft 1 adjacent the end plate 5 is a centrifugal impeller 16 having vanes 17, and mounted in the casing 3 and rotatable therewith is a turbine runner 18 having vanes 19. The impeller 16 and turbine runner 18 together form a fluid coupling, indicated generally by the numeral 15. The vanes 17 and 19 cooperate to form intervening, oppositely disposed buckets which together form a fluid circuit which is illustrated as being generally oval in shape, the impeller and turbine being balanced hydraulically so as to be non-productive of axial thrust. Openings 20 in the impeller shell provide for the escape of entrapped air when the fluid coupling is initially operated.

The turbine runner 18 is formed in an elliptical portion of the casing 3, the web or shell of the runner comprising a portion of the wall of the casing. In the device illustrated in the drawings, the turbine vanes 19 are cast integrally with the casing, though it will be appreciated that the runner may be cast separately and later affixed to the casing by any suitable means. In the present design the vanes of both impeller and turbine runner are made perpendicular to the respective webs or shells, the important angles at entrance and exit being as shown in Figure 8.

A ring valve 21 is slidably mounted in an annular slot 22 formed between the shrouds for the impeller and the turbine runner. The ring valve 21 is operable by means of rods 23 which extend longitudinally of the casing 3 and project endwise therefrom. For controlling the ring valve 21 there is provided a collar 24 loosely mounted over the driven shaft 2, and extending radially from the collar 24 is a spider 25, the ends of which terminate in a ring 26 to which the outer ends of the rods 23 are secured as by nuts 27. The collar 24 is moved longitudinally over the shaft 2 by means of a suitable lever generally indicated at 28. The lever 23 terminates in a ring-like flange 29 which encircles a flange on the collar 24. A bearing 30 between the flange 29 and the collar 24 permits rotation of the collar relative to the actuating lever 28. The mechanism just described is operable to move the ring valve 21 into position to open or close the fluid circuit in the fluid coupling.

Mounted upon the end of the drive shaft 1 are the elements of the delivery pump constituting a part of the pressure drive, comprising a rotor 32 having rotor blades 33. The rotor chamber is defined by a sleeve 34 and by end surfaces consisting of flanges 35—35 on the drive shaft 1 and wearing plates 36—36 which together form the closure members for the ends of the rotor chamber. A cover plate 37, secured in place by cap screws 38, defines one wall of a passage 41 leading from discharge port 57 to pressure chamber 58. The working surfaces of the sleeve 34 are formed upon diametrically opposite arcs of concentric circles, and by intermediate or connecting wall portions formed upon diametrically opposite arcs of eccentric circles. Any one diametral chord passing through the center of the sleeve 34 is equal in length to every other diametral chord likewise passing through the center of the sleeve, whereby the end surfaces of the rotor blades 33, formed by rocker arms, are at all times in fluidtight contact with the walls of the rotor chamber. For convenience in construction and assembly, the pump rotor is made in four parts, each part being bolted to the flanges 35—35 by means of through bolts 39. The sleeve 34 is keyed into a cylindrical portion 40 cast integrally with the casing 3.

The inner end of the shafts 1 and 2 are received in bearings 42—42 which support the radial load of the casing at its center.

The construction of the motor rotor is similar to that of the pump rotor. The motor rotor 43 is mounted on the inner end of the driven shaft 2 and operates in a motor chamber defined by a sleeve 44 and end surfaces comprising at each end of the chamber a flange 45 on the driven shaft and a wearing plate 46. Through bolts 49 secure the respective parts of the rotor 43 to the flanges 45—45. The working surfaces of the sleeve 44 also are formed upon diametrically opposite arcs of concentric circles and by intermediate or connecting wall portions formed upon diametrically opposite arcs of eccentric circles, whereby any one diametral chord passing through the center of the sleeve 44 is equal in length to every other diametral chord likewise passing through the center of the sleeve. The sleeve 44 is mounted in a cylindrical portion 70 cast integral with the casing 3.

The end of the casing 3 adjacent the motor rotor is supported upon bearings 50 mounted in a hub portion 47 of the casing, these bearings being secured in place by means of a nut 51 threaded onto the shaft. A cover plate 52 carries oil seal rings 53.

While the illustrated embodiment of the invention is herein shown and described as utilizing rotary pumps in both the delivery and the receiving ends of the casing, these are not used in a limiting sense, since other types of pumps could as well be used. The difference in capacities between the pump and motor is not indicated, since it will be appreciated that it is necessary only that the motor be designed of greater capacity than the pump to meet the torque requirements of the driven shaft.

Fluid is introduced into the casing in an amount sufficient to practically fill the cylindrical portion of the casing, leaving as room for expansion the uppermost portion of the elliptical part of the casing housing the turbine runner. Between the outer wall of the casing and the cylindrical portion 70 housing the motor rotor is a chamber 54 into which the fluid is discharged from the motor and which forms a reservoir. Communicating with the reservoir 54 are ports 55, these being intake ports for the pump. Fluid is discharged from the pump by way of ports 57 which communicate with a pressure chamber 58.

Positioned between the pump and motor are chambers $a$ and $b$, and fluid under pressure is delivered to one of these chambers from the pressure chamber 58 according to in which direction the driven shaft is to be rotated. Chamber $a$ is enclosed by transverse walls which separate it from the pressure chamber 58 and from the reservoir 54, and by longitudinal walls $a^1$ and $a^2$. Chamber $b$ is enclosed by transverse walls which likewise separate it from the pressure chamber 58 and the reservoir 54, and by longitudinal partition walls $a^2$ and $b^1$. A chamber $c$ is enclosed by walls $c^1$ and $c^2$ and positioned between the cylindrical portion 70 housing the motor rotor and the outer shell of the casing 3. The chambers $a$ and $b$ communicate with the motor chamber through ports $p$ and $p'$, respectively. The chamber $c$ forms a passage between the chamber $b$ and the reservoir 54, means being provided to close the port 86 between the chamber $c$ and reservoir 54 to lock the transmission mechanism in direct drive.

For determining the direction of rotation of the driven shaft there are provided valves 61 and 62 interconnected in spaced apart relation and actuated by a valve stem 63; also valve 64 mounted on valve stem 65. (See Figure 2.) The setting of these valves determines to which side of the blades 48 in the motor rotor is admitted fluid under pressure, and from which side of said blades 48 fluid is discharged to the reservoir 54. Valves 61 and 62 are slidably mounted in a sleeve 66 formed by a cylindrical portion 66$a$, and valve 64 is slidably mounted in a sleeve 67 formed by a cylindrical portion 67$a$. In forward drive the pressure pump is in communication with the pressure motor by way of ports 57, pressure chamber 58, port 59, chamber $a$ and port $p$; and fluid is discharged from the motor into chamber $b$ through port $p'$ and from thence into chamber $c$ through port 60. From chamber $c$ the fluid flows through port 86 to the reservoir 54 excepting at such times when port 86 is closed by valve 76 and a direct drive obtains between the driving and driven shafts. When it is desired to drive the driven shaft in a direction opposite to the direction of rotation of the drive shaft, hereinafter referred to as "reverse drive," valve 64 is moved into position to close the port 60 and open the port 68 whereupon fluid from the pressure chamber 58 enters chamber $b$ through port 68 and is delivered to the motor through port $p'$. At the same time the valve 61 is moved into an inactive position in sleeve 66 to open port 69, providing for the discharge of fluid from the motor chamber through port $p$ into chamber $a$ and into the reservoir through port 69, while valve 62 (mounted on the same valve stem 63 as valve 61) is moved into position to close port 59 and cause fluid from the pressure chamber 58 to enter the chamber $b$ by way of port 68.

Figure 2:
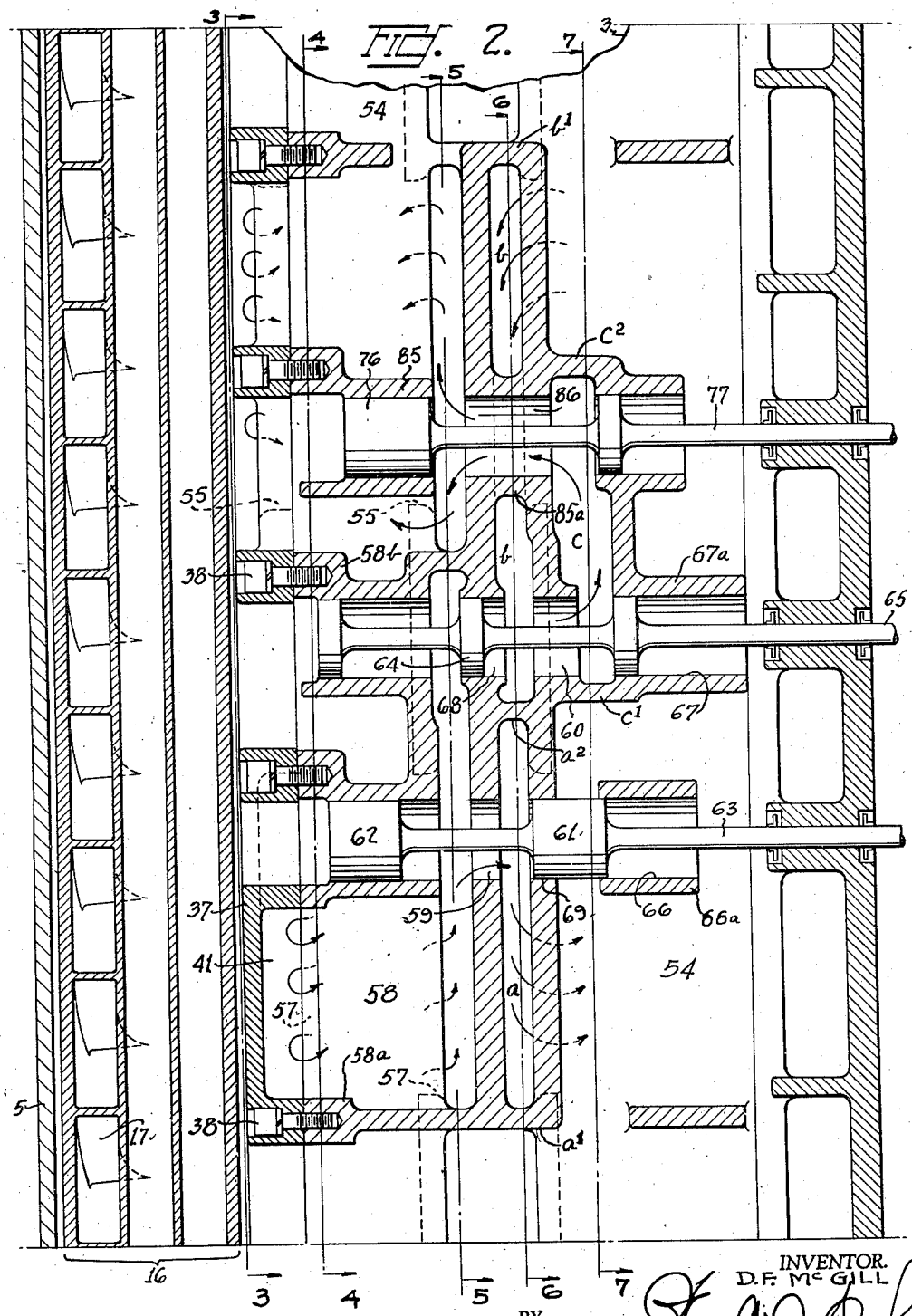
Figure 3:
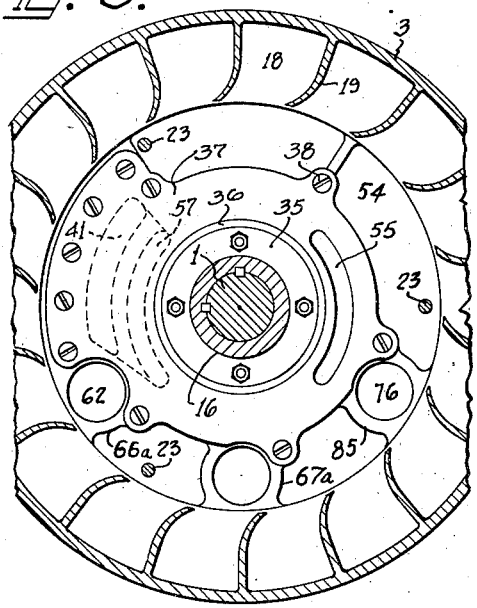
Figure 3 is a vertical section of the transmission unit, taken on the line 3—3 of Figure 1, illustrating a portion of the turbine runner and showing in full lines the cover plate for the pump rotor, as well as the relative positions of the valve sleeves for the reversing and control valves.
Figure 4:
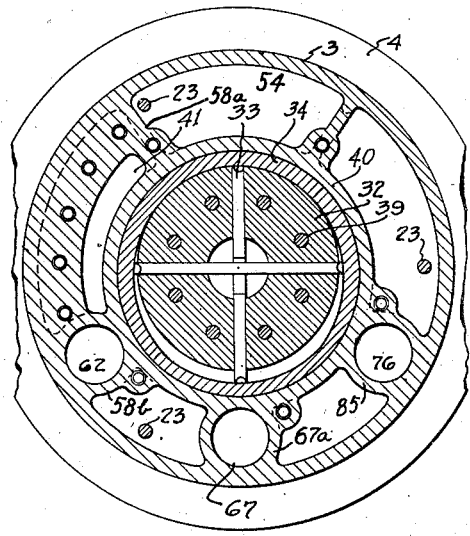
Figure 4 is a vertical section of the transmission unit, taken on the line 4—4 of Figure 1, illus-

The valve stems 63 and 65 extend longitudinally of the casing and project endwise therefrom, and are secured at their ends to ring 71 as by nuts 72. The ring 71 is mounted on the ends of spiders 73 which project radially from a collar 74 rotatively and slidably mounted on the drive shaft 2. Thus it will be seen that valves 61, 62 and 64 are operated simultaneously by movement of the collar 74. The collar 74 is actuated by a lever mechanism indicated at 75 rotatably engaging the collar by means of bearings disposed between flanges on the collar and on the lever arm, as described in connection with the control mechanism for the ring valve 21. Movement of the collar 74 in a direction toward the casing 3 will position the valves 61, 62 and 64 as illustrated in Figure 2, in which position intake port 59 is open, providing communication between pressure chamber 58 and the motor chamber through chamber $a$ and port $p$, and discharge port 60 is likewise open, providing communication between the motor chamber and the reservoir 54 through port $p'$, chamber $b$, port 60, chamber $c$ and port 86, in which positions of the valves the shaft 2 is driven in a forward direction. Upon movement of the collar 74 in a direction away from the casing 3, intake port 59 is closed by valve 62 and intake port 68 is opened. At the same time discharge port 60 is closed by valve 64 and discharge port 69 is opened by movement of valve 61 to inactive position. Thus communication is provided between pressure chamber 58 and the motor chamber by way of port 68, chamber $b$ and port $p'$ and between the motor chamber and the reservoir by way of port $p$, chamber $a$ and port 69, in which position of the valves shaft 2 is caused to be driven in a reverse direction.

For obtaining a direct drive between the driving and driven shafts there is provided a control valve 76 operable by a valve stem 77 which also extends longitudinally of the casing and projects endwise therefrom. The valve stem 77 is secured to an arm 78 as by a nut 79, the arm 78 projecting laterally from a collar 81. The collar 81 is slidably and rotatably mounted on the shaft 2 and is movable longitudinally thereover to effect movement of the control valve 76 by means of a lever generally indicated at 82. A flange 83 on the lever 82 rotatably engages the collar 81, a bearing 84 being disposed therebetween. Movement of the collar 81 toward the casing 3 causes the control valve 76 to be moved into inoperative position in a sleeve 85 formed by cylindrical portion 85$a$, thus opening port 86 and providing communication between the spaces 54, into which fluid is discharged from the motor chamber, and intake ports 55 of the pump chamber. Movement of the collar 81 a predetermined distance away from the casing 3 causes the control valve 76 to close the port 86 and so create a fluid locked condition between driving and driven parts of the transmission. When this condition prevails, all of the rotatable parts of the transmission rotate together at the same speed, thus effecting a driving ratio of 1:1.

A control mechanism for controlling movement of the control valve 76 is fully illustrated and described in Letters Patent No. 2,369,835, issued to me February 20, 1945, by means of which the driving ratio may be controlled by mechanism operable either manually or entirely automatically, or by a combination of manually and automatically operated controls, for example, as described in said Letters Patent.

For holding the casing 3 stationary, as when the driven shaft is to be driven in a reverse direction, there is provided braking means consisting of a brake band 87 adapted to be brought into braking engagement with a cylindrical surface 88 on the casing. The brake band 87 is actuated by means of a lever 89 in a manner well understood in the art. When it is desired to drive the driven shaft in a reverse direction, the brake is applied to hold the casing stationary, and the ring valve 21 moved to close the fluid circuit in the fluid coupling 15. Thereupon collar 74 is moved a predetermined distance away from the casing 3, thus changing the direction of flow of fluid through the motor chamber in the manner hereinbefore described to cause the shaft 2 to be driven in the direction opposite to the direction of rotation of the drive shaft. Whenever the casing 3 is held stationary and the fluid circuit in the fluid coupling is closed, the driven shaft may be driven either in forward or reverse direction at the positive gear ratio existing between the pump and motor merely by actuating the direction control lever. This may be desirable, for example, when effecting short directional drives, as when parking an automobile equipped with the device.

An embodiment of the invention may employ an overriding clutch or free wheeling unit 11, illustrated in the drawings as having spokes 90 bolted to the shell 7. When a free wheeling unit is employed, as in the manner illustrated, the casing 3 is free to rotate only in the direction of rotation of the drive shaft, the free wheeling unit preventing rotation of the casing in a reverse direction. When the casing is so prevented from rotating in a reverse direction the lowest speed ratio that can be obtained with the device will be equal to the ratio of the capacities of the pump and motor means with the casing 3 held stationary. For example, if the capacity of the motor is twice that of the pump the lowest speed of the driven shaft will be one half the speed of the driving shaft. The speed of the driven shaft can then be increased from such half speed up to a 1 to 1 ratio as the speed of the casing 3 is increased up to the point where the casing is rotating at the same rate of speed as the drive shaft. In constructions where the free wheeling unit is not employed, during operations requiring the application of heavy torque the casing may rotate in the reverse direction, the transmission mechanism being productive of speed ratios from zero to 1:1. In either instance the fluid coupling 15 forms a hydraulic abutment which enables the development of heavy torque in the driven shaft at low speeds.

As has been stated hereinabove, rotation of the casing 3 is governed solely by the torque requirements of the driven shaft. In the transmission mechanism hereinabove described, employing a freely rotatable casing having mounted therein a pressure drive comprising a pressure pump mounted on the drive shaft and a pressure motor mounted on the driven shaft, and also as illustrated in Letters Patent No. 2,323,926, issued to me July 13, 1943, and in Letters Patent No. 2,369,335 issued to me February 20, 1945, and wherein the rotation of the casing is likewise governed solely by the torque requirements of the driven shaft, the production of heavy torque in the driven shaft may so much retard the forward rotation of the casing as to cause it to cease its forward rotation, and may even cause the casing to rotate slowly in a reverse direction. At speeds requiring the production of a lighter torque in the driven shaft, the casing rotates in a forward direction at speeds approximating the speed of the driven shaft; and at a gear ratio of 1:1 the drive shaft, the casing, and the driven shaft rotate together at the same speed.

In the mechanism disclosed and described in the Letters Patent hereinabove referred to, the reaction torque created by operation of the pressure motor is resisted by operation of the pressure pump and the centrifugal pump, these elements serving in the dual capacity of pump for energizing the fluid and delivering it to the pressure motor, and of an hydraulic abutment for rotating the casing against the resistance of the reaction torque created by the motor. In the present invention the resistance to forward rotation of the casing offered by the reaction torque created by operation of the pressure motor is overcome by the torque created by operation of the fluid coupling; and the pressure pump is enabled to deliver maximum fluid energies to the pressure motor and so produce heavier torque in the driven shaft.

In the present disclosure the use of a particular design of fluid coupling is intended to be illustrative only, and not in any limiting sense, since it will be appreciated that the center line shapes of the impeller and turbine runner vanes may differ with each different embodiment of the invention. Moreover, no limitation is intended by the recitation of a structural peculiarity of any part of the transmission mechanism, except as carried into the claims hereto appended. Nor is it intended to limit the application of the invention for use with an overriding clutch, since experience has taught that this device is needful only when driving at extremely low speeds with low gear ratios, or in installations designed for very heavy torque. Applicant believes himself entitled to all uses, modifications, and/or variations of the invention as fall within the spirit and scope of the appended claims.

Having now described my invention and in what manner the same may be used, what I claim as new and desire to protect by Letters Patent is:

1. In a fluid transmission mechanism: a drive shaft and a driven shaft; a kinetic drive comprising a centrifugal impeller operatively connected to the drive shaft, and a turbine runner; a pressure drive comprising a delivery pump and a receiving pump or motor, elements of the delivery pump operatively connected to the drive shaft, elements of the receiving pump operatively connected to the driven shaft; housings for said pump and motor, elements of the delivery pump and elements of the receiving pump operatively connected to said housings and cooperating with said first named elements, said housings and said turbine runner being integrally joined for common rotation about said shafts.

2. In a fluid transmission mechanism: a drive shaft and a driven shaft; a kinetic drive comprising a centrifugal impeller operatively connected to the drive shaft, and a turbine runner; a pressure drive comprising a delivery pump and a receiving pump or motor, elements of the delivery pump operatively connected to the drive shaft, elements of the receiving pump operatively connected to the driven shaft; housings for said pump and motor, elements of the delivery pump and elements of the receiving pump operatively connected to said housings and cooperating with said first named elements, said housings and said turbine runner being integrally joined for common rotation about said shafts; valve means for controlling the direction of rotation of the driven shaft; a control valve operable to fluid lock the transmission mechanism to create a 1:1 gear ratio, and brake means for braking said housings when the driven shaft is rotated in a direction opposite to the direction of rotation of the drive shaft.

3. In a fluid transmission mechanism: a driving shaft and a driven shaft; a kinetic drive comprising a centrifugal impeller operatively connected to the drive shaft, and a turbine runner; a pressure drive comprising a delivery pump operatively connected to the drive shaft, and a receiving pump or motor operatively connected to the driven shaft; said drives including a common rotating member containing fluid passageways to provide a simultaneous operation of said drives, said turbine runner being operatively connected to said common rotating member; and a valve operable to fluid lock the transmission mechanism, including said common rotating member, to create a direct drive between driving and driven shafts.

4. In a fluid transmission mechanism: a driving shaft and a driven shaft; a kinetic drive comprising a centrifugal impeller operatively connected to the drive shaft and a turbine runner; a pressure drive comprising a delivery pump operatively connected to the drive shaft and a receiving pump or motor operatively connected to the driven shaft; said drives including a common rotating member containing fluid passageways to provide a simultaneous operation of said drives, said turbine runner being operatively connected to said common rotating member.

5. In a fluid transmission mechanism: a driving shaft and a driven shaft, a kinetic drive comprising a centrifugal impeller and a turbine runner, a pressure drive comprising a delivery pump and a receiving pump or motor, said drives including a common rotating member containing fluid passageways providing for the simultaneous operation of said drives, said centrifugal impeller and elements of the delivery pump operatively connected to the drive shaft, elements of the receiving pump operatively connected to the driven shaft, said turbine runner being operatively connected to said common rotating member, elements of the delivery pump and elements of the receiving pump operatively connected to said rotating member and cooperating with said first named elements, valve means for controlling the direction of rotation of the driven shaft, and a control valve operable to fluid lock the transmission mechanism to create a 1:1 gear ratio.

6. In a fluid transmission mechanism: a drive shaft and a driven shaft; a casing enclosing the adjacent ends of said shafts and rotatable relative thereto; the combination of a kinetic drive coupling consisting of a centrifugal impeller operatively connected to the drive shaft and a turbine runner operatively connected to the said casing, and a pressure drive coupling comprising elements of a pressure pump operatively connected to the drive shaft and elements of a pressure motor operatively connected to the driven shaft; said casing coacting with said pump elements to form a delivery pump and coacting with said motor elements to form a motor.

7. In a fluid transmission mechanism: a drive shaft and a driven shaft; the combination of a kinetic drive coupling comprising a centrifugal impeller and a turbine runner, said impeller being operatively connected to the drive shaft; and a pressure drive comprising elements of a delivery pump operatively connected to the drive shaft and elements of a motor operatively connected to the driven shaft; a housing enclosing said pump elements and coacting therewith to form a delivery pump, a housing for said motor elements and coacting therewith to form a motor, said housings and said turbine runner being integrally joined for common rotation about said shafts.

8. In a fluid transmission mechanism: a drive shaft and a driven shaft; a kinetic drive coupling comprising a centrifugal impeller operatively connected to the drive shaft, and a turbine runner; a pressure drive comprising elements of a delivery pump mounted on said drive shaft, elements of a motor mounted on said driven shaft; and a cylindrical casing mounted on said shafts and rotatable relative thereto, and coacting with said pump elements to form a delivery pump, and coacting with said motor elements to form a motor; said turbine runner being operatively connected to said casing and rotatable therewith.

9. In a fluid transmission mechanism: a drive shaft and a driven shaft; the combination of a kinetic drive coupling comprising a centrifugal impeller and a turbine runner, said impeller being operatively connected to the drive shaft; and a pressure drive consisting of a pressure pump and pressure motor; elements of a delivery pump mounted on said drive shaft; elements of a motor mounted on said driven shaft; a cylindrical casing mounted on said shafts and rotatable relative thereto, and coacting with said pump elements to form a delivery pump, and coacting with said motor elements to form a motor, said turbine runner being operatively connected to said casing and rotatable therewith.

10. In a transmission mechanism: a drive shaft and a driven shaft having driving and driven members operatively connected to respective ones of said shafts, a housing rotatably journaled on said shafts and having elements coacting with said driving and driven members respectively, a fluid coupling comprising a turbine runner operatively connected to said housing forming a reaction abutment for said driven member, and means for locking the transmission mechanism, including said housing, in direct drive whenever the speed of said driving and driven members approaches a 1:1 ratio.

11. In a transmission mechanism: a drive shaft and a driven shaft having driving and driven members operatively connected to respective ones of said shafts, a housing rotatably journaled on said shafts and having elements coacting with said driving and driven members respectively, a fluid coupling comprising a turbine runner operatively connected to said housing forming a reaction abutment for said driven member, an overriding clutch connected to said housing for permitting rotation of said housing only in the direction of rotation of the drive shaft, and means for locking the transmission mechanism, including said housing, in direct drive whenever the speed of said driving and driven members approaches a 1:1 ratio.

12. In a fluid transmission mechanism, a driving shaft and a driven shaft; a kinetic drive comprising a centrifugal impeller operatively connected to the drive shaft, and a turbine runner; a pressure drive comprising a delivery pump operatively connected to the drive shaft, and a receiving pump or motor operatively connected to the driven shaft; said drives including a common rotating member containing fluid passageways to provide simultaneous operation of said drives, said turbine runner being operatively connected to the common rotating member; and an overriding clutch engaging said rotating member for permitting rotation of said member only in the direction of rotation of the drive shaft.

DANIEL F. McGILL.